Oct. 1, 1935.                H. GOTTSCHALK                2,015,890
                               CLUTCH DISK
                            Filed Jan. 27, 1934
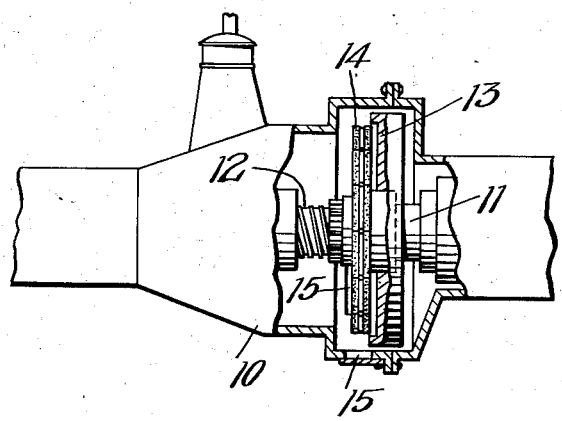
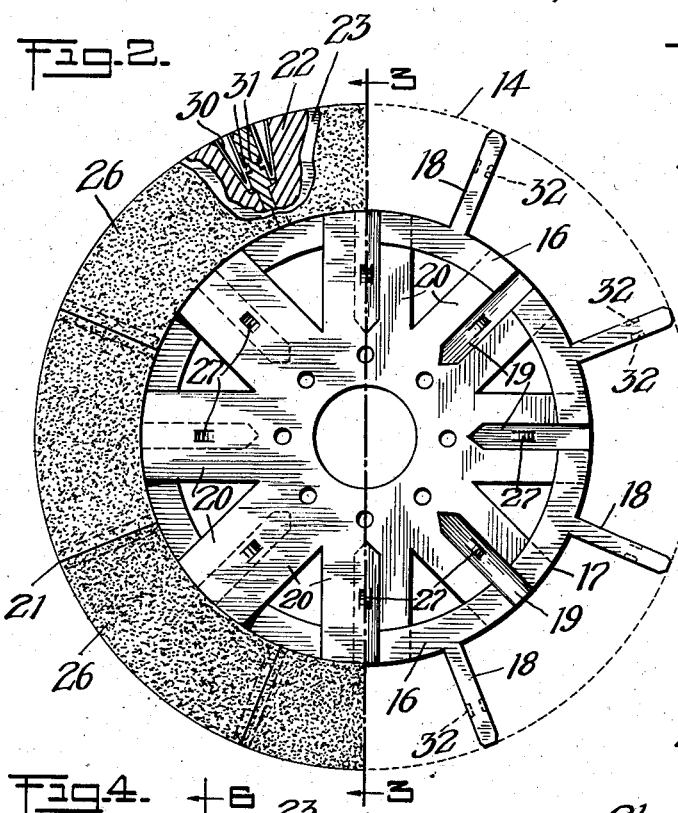
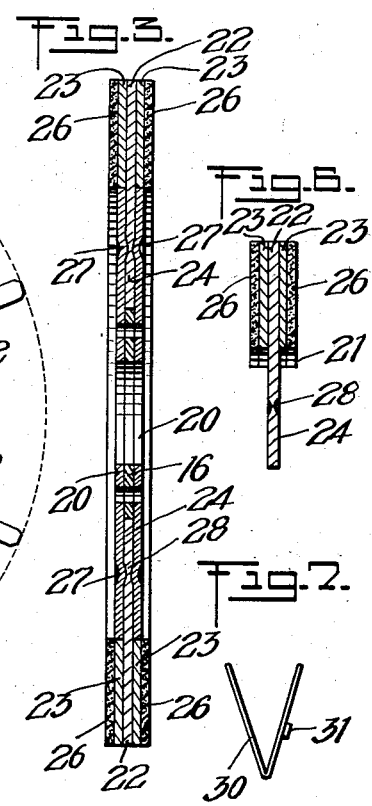
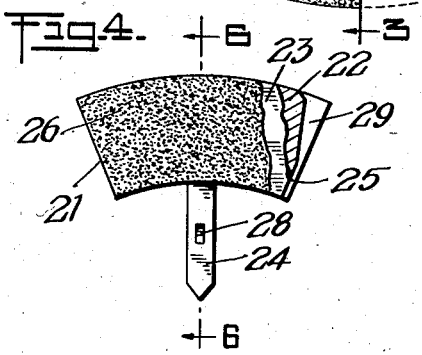
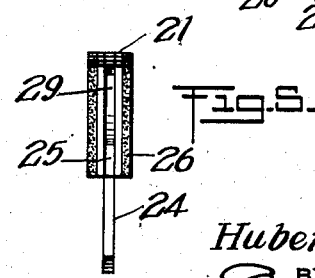
INVENTOR
Hubert Gottschalk
BY
ATTORNEY Patented Oct. 1, 1935

2,015,890

UNITED STATES PATENT OFFICE 2,015,890

CLUTCH DISK

Hubert Gottschalk, New York, N. Y.

Application January 27, 1934, Serial No. 708,591

6 Claims. (Cl. 192—107)

This invention relates to improvements in clutches, and more particularly to the part thereof generally referred to as the clutch disk.

Among the principal objects which the present invention has in view are: To provide an improved clutch disk; to enable the wearing surface of the clutch disk to be replaced or repaired in whole or in part without having to disassemble the transmission and/or transmission housing; to provide readily removable segments for a clutch disk; to insure the segments remaining in perfect alinement in use; to positively lock the segments in assembled position; and to secure simplicity of construction and operation.

Drawing:

Figure 1 is an elevation of transmission housing partly broken away showing parts of a clutch essential to the present invention;

Figure 2 is a face view of a clutch disk showing part of the same with one of the face plates and clutch segments removed, and showing adjacent ends of a pair of segments and the intervening spoke in section for illustrating the locking means for retaining the segments in place;

Figure 3 is a sectional view shown as taken on line 3—3 of Figure 2;

Figure 4 is a face view of one of the segments with laminations thereof broken away for showing the ones thereunder;

Figure 5 is an end view of a segment;

Figure 6 is a sectional view of the segment shown as taken on line 6—6 of Figure 4; and Figure 7 is a detail elevation of one of the spring clips or holding means by which the segments are held in position.

As seen in the drawing, the transmission housing 10 is shown illustrating generally a driving shaft 11 therein actuated by an engine or other source of power (not shown), and showing a driven shaft 12 which, through suitable gearing and other connections may be utilized for such purpose as driving a vehicle. Between the drive shaft 11 and driven shaft 12 is a suitable clutch mechanism, operable in any suitable or well known manner to releasably make connection between the two shafts. I have deemed it unnecessary to go into the details of the releasing means and for purposes of the present invention have shown a driving plate 13 and a clutch disk 14 which are engageable flatwise when a driving connection between shafts is desired, and which are separable in an axial direction when it is desired to disconnect the driving shaft from the driven shaft.

In the prior art, it has been almost invariably necessary to disassemble the transmission housing and the transmission in order to apply a new clutch facing to the releasable clutch disk. According to the present invention, no such disassembly is required and the change may be effected by subsequently described removal of segments of the clutch disk through one or more hand holes 15 provided in housing 10. The hand hole 15 is preferably positioned in the housing so as to be opposite the edge of the clutch disk 10 thereby enabling segments of the disk to be moved in their own plane radially outward through the hand hole. Furthermore, the hand hole is preferably as long as any one segment, thereby rendering removal and insertion of the segment most convenient.

The clutch disk 14 in which the present invention inheres more particularly, preferably comprises a laminated structure. A central plate or lamination 16 is preferably stamped from sheet metal and provides an inset circumference 17 from which protrude a plurality of radially extending spokes 18. The depth of the spokes and the distance from one spoke to the next is substantially equal to the removable segment above mentioned and hereinafter described. Intermediate of each pair of protruding spokes 18, 18, is provided at least one socket 19 extending inwardly from circumference 17. In the present showing only one socket 19 is shown between each pair of spokes, and it is therefore preferable to have said socket and said spokes all directed radially with respect to the center of lamination 16 and the completed clutch disk.

Socket 19 is conveniently formed by making a slit completely through said lamination 16 from one side face to the other side face thereof. All sides of this socket are closed except the outer end thereof either by the edges of lamination 16 or by faces of outer plates or laminations 20, 20, which are positioned flatwise against opposite sides of central lamination 16.

Segments 21 are provided for insertion and retention between spokes 18, 18. These segments are likewise preferably of laminated structure, comprising a central lamination 22 on opposite faces of which are laminations 23, 23, these several laminations preferably being of approximately corresponding thickness to the central lamination 16 and outer laminations 20, 20 of the body portion of the clutch disk structure. By virtue of this construction, the middle lamination 22 of segment 21 may have a shape and a dimension to fit between a pair of spokes 18, 18 in the plane thereof and with its inner edge arcuately shaped to abut the corresponding portion of circumference 17 of the body portion central lamination 16. Furthermore central lamination 22 of the segment is provided with a prong 24 projecting radially inwardly from its concave arcuate edge, said prong having appropriate dimensions to substantially fit within socket 19. Outer laminations 23, 23 of the segment 21 are preferably somewhat longer than the middle lamination so as to provide therewith an end groove 25 for the segment. This end groove 25 receives an edge of spoke 18 therein, thereby retaining the segment in proper flatwise relation. The positioning of prong 24 within socket 19 not only acts to guide the segment to its proper position for engaging grooves 25 with spokes 18, but also cooperates in use to maintain the segment in said flatwise relationship.

The outer surfaces of outer laminations 23, 23, are preferably faced for frictional engagement. As here shown, a lining 26 of suitable material for the purpose is applied to and permanently held upon said outer lamination. The outer lamination and the said lining having substantially the same shape. The several segmental sections of lining 26 when all positioned provide a pair of sectional rings of the friction material, one ring being upon one side of the clutch disk and the other ring being opposed thereto upon the other side of the clutch disk.

For retaining the segments in their respective positions, I preferably provide a friction means in connection with prong 24 of the segment. As here shown, each of the outer laminations 20 of the body portion of the disk have protuberances 27 which project into socket 19, one from each side, and engage within a corresponding depression 28, made in the prong. There is sufficient resiliency in laminations 20, 20 to enable prong 24 to be forced in or out of socket 19 past the protuberances. The segments consequently will remain in position until positively extracted.

It is further preferable to provide positive locking means to prevent the segments from removal inadvertently, for instance, as a result of centrifugal action. Such a positive means is illustrated in Figures 2, 4 and 7, wherein the central lamination 22 of the segment 21 is tapered outwardly to provide an enlarged portion or pocket 29 in the groove 25 capable of receiving a hairpin spring lock 30. Said spring lock normally tends to have its legs spread apart, and on one of these legs is a lug 31 which is forced into a corresponding positioned recess 32 in the edge of the spoke. A flare in the outer end of the pocket 29 makes it easy for a mechanic to pinch the ends of the hair-pin lock together and remove the same. When the pair of hair-pin locks at opposite ends of a segment are removed, the mechanic can then readily pull the segment radially outward, insert a new one, return the locks, and proceed to the next one. Replacement of a single segment may accordingly be effected in a very few minutes, and replacement of all of the segments would involve no serious period of time, and in no case require any disassembly of the housing or general transmission.

I claim:

1. A clutch disk as characterized having removable segments, and yieldable locking means for said segments, said yieldable locking means being accessible at the outer edge of the segments.

2. A clutch disk as characterized having a body portion, segments carried by and removable from said body portion, said body portion and segments having inter-engaging prongs and sockets for mounting the segments with respect to the body portion, and yieldable means for locking said segments to said body portion.

3. A clutch disk as characterized having a body portion, segments carried by and removable from said body portion, said body portion and segments having edges and grooves for mounting the segments rigidly in a common plane, and a hair-pin-like spring for removably locking said segments to said body portion.

4. A clutch disk as characterized having a body portion, segments carried by and removable from said body portion, said body portion and segments having inter-engaging prongs and sockets for mounting the segments with respect to the body portion, and frictionally engaging protuberance formed on the body portion and a depression on the prong for retaining the prong in the socket and the segment in place.

5. A clutch disk as characterized having a body portion, a segment carried by and removable from said body portion, and a hair-pin lock insertable between a part of the body portion and a part of the segment and normally retaining the segment in place on the body portion.

6. A clutch disk as characterized having a body portion, a segment carried by and removable from said body portion, said body portion having a recess at one part thereof, and a hair-pin lock having a protuberance and insertable between a part of the body portion and a part of the segment, said protuberance engaging the recess in the body portion whereby the segment is normally retained in place on the body portion.

HUBERT GOTTSCHALK.